United States Patent [19]

Brown et al.

[11] Patent Number: 4,998,442

[45] Date of Patent: Mar. 12, 1991

[54] GANTRY ROBOT CONSTRUCTION AND DRIVE MECHANISM

[76] Inventors: Gordon T. Brown, 2045 Murdstone Rd., Pittsburgh, Pa. 15241; David A. Stewart, 2221 Ben Franklin Dr., Pittsburgh, Pa. 15237

[21] Appl. No.: 435,538
[22] PCT Filed: May 30, 1989
[86] PCT No.: PCT/US89/02341
    § 371 Date: Oct. 30, 1989
    § 102(e) Date: Oct. 30, 1989
[87] PCT Pub. No.: WO89/12019
    PCT Pub. Date: Dec. 14, 1989

Related U.S. Application Data

[63] Continuation-in-part of Ser. No. 200,406, May 31, 1980.

[51] Int. Cl.$^5$ .................. F16H 27/02; F16H 55/08
[52] U.S. Cl. .................. 74/89.17; 74/422; 74/462; 74/465
[58] Field of Search .................. 74/89.17, 422, 462, 74/465

[56] References Cited

U.S. PATENT DOCUMENTS

| | | | |
|---|---|---|---|
| 3,139,771 | 7/1964 | Maroth | 475/164 |
| 3,267,763 | 8/1966 | Merritt | 74/422 |
| 3,845,670 | 11/1974 | Grayson | 74/465 |
| 4,036,071 | 7/1977 | McKnight et al. | 74/465 X |
| 4,116,081 | 9/1978 | Luttrell et al. | 74/465 X |
| 4,121,482 | 10/1978 | Ishikawa et al. | 74/462 |
| 4,222,282 | 9/1980 | Taig | 74/457 |
| 4,236,758 | 12/1980 | Groger | 299/42 |
| 4,270,401 | 6/1981 | Davidson | 74/462 |
| 4,487,088 | 12/1984 | Olson | 74/462 |
| 4,570,504 | 2/1986 | Sitta et al. | 74/422 X |
| 4,879,920 | 11/1989 | Kerkhoff | 74/352 |

FOREIGN PATENT DOCUMENTS 608028  4/1978  U.S.S.R. .................. 74/422

OTHER PUBLICATIONS

Drago, *Fundamentals of Gear Design*, pp. 57-58, 63-68 and 169-191.
Marks, *Standard Handbook for Mechanical Engineers*, Seventh Edition, pp. 8-132 and 8-133.
Khiralla, *On The Geometry of External Involute Spur Gears*, pp. 55-56, 1976.
French et al., *A Manual of Engineering Drawing for Students and Draftsmen* (1953), p. 464, 1953.
Colbourne, *The Geometry of Involute Gears*, pp. 23-29, 32-35, 40-49, 52-65 and 82-91, 1978.
Oberg et al., *Machinery's Handbook*, 22nd Edition, pp. 612-625, 630-631, 644-645, 650-651, 656-659 and 662-665.
Dudley, *Handbook of Practical Gear Design*, pp. 1.26-1.29, 2.14-2.15, 2.20-2.21, 3.8-3.13, 3.18-3.21 and 9.4-9.9.
Dubbel's *Manual for Mechanical Engineering* (1958), p. 668, (with English Translation attached).
Deutschman, Aaron D., *Machine Design: Theory and Pratice*, Macmillian Pub. Co., N.Y., 1975, p. 540.

Primary Examiner—Allan D. Herrmann
Assistant Examiner—David W. Laub
Attorney, Agent, or Firm—Walter J. Blenko, Jr.; David V. Radack

[57] ABSTRACT

A gantry robot construction is provided. The construction includes a pair of elongated substantially spaced parallel rails, a bridge spanning and substantially perpendicular to the rails and movable relative to the rails, and a robot head and support mounted on the bridge and movable relative to the bridge. The rails are positioned along the width or shorter side of the work area with the bridge spanning the length or longer side of the work area. An improved rack and pinion apparatus is also disclosed that is used in association with the gantry robot construction. There is a zero degree pressure angle between the rack and pinion. In the pinion the base circle is congruent with the pitch circle.

11 Claims, 6 Drawing Sheets

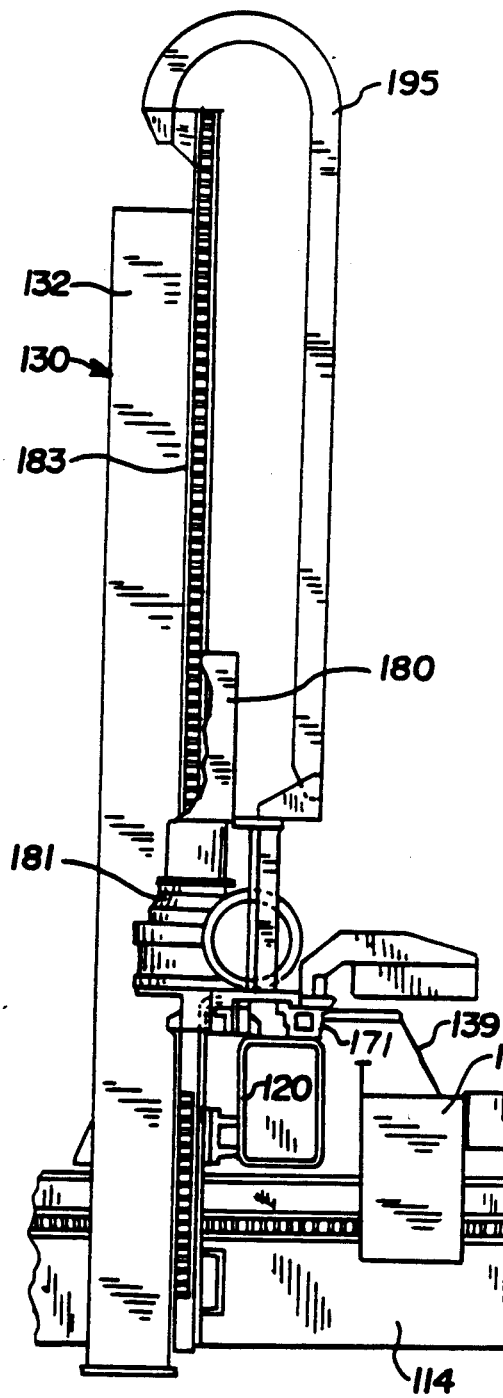
FIG. 4
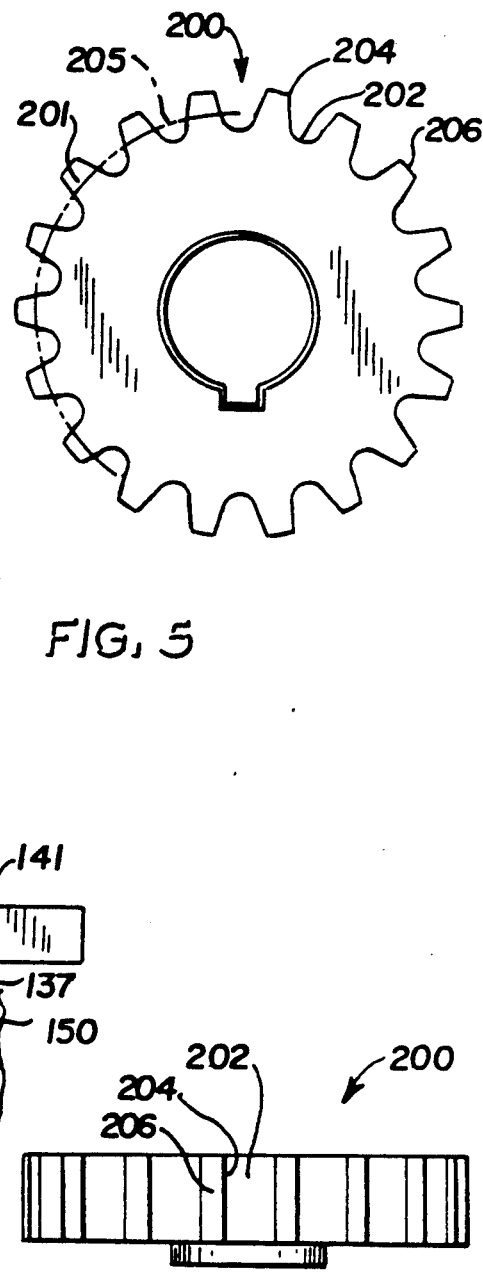
FIG. 5
FIG. 6

GANTRY ROBOT CONSTRUCTION AND DRIVE MECHANISM

CROSS REFERENCE TO RELATED APPLICATION

This application is a continuation-in-part of application Ser. No. 200,406 filed May 31, 1988, and a continuation of PCT/US89/00090 filed Jan. 11, 1989.

BACKGROUND OF THE INVENTION

1. Field of the Invention

This invention relates to a gantry robot construction and to a drive mechanism useful for a gantry robot. More particularly, it relates to a construction which increases the speed and efficiency of a gantry robot.

2. Description of the Related Art

Robots are used in a variety of applications. A robot can perform repetitive tasks, such as welding, sealing, gluing, water-jet and laser cutting, and material handling with reliability and accuracy.

A robot must be placed in the area of the product to be manufactured or handled. This area is called the "work area". There are basically two methods of placing robots in a work area. The first is by placing the robot on a rotary pedestal which is operatively associated with a track. The robot is moved in and about the work area by controlling its motion on the pedestal and track. The disadvantage of this type of robot is that the working area or "envelope" in which it can operate is rather limited.

The second method of placement and the one with which this application is concerned, is by using a gantry construction. Gantry robots are typically of the "standard bridge type" and are mounted overhead the work area or envelope. The standard bridge gantry construction consists of a pair of spaced parallel beams or rails mounted on floor supports that suspend the rails from the ground or shop floor. A bridge spans the distance between the rails and is movable relative to the rails. The robot is comprised of a robot support which is movable with respect to the bridge and a robot head attached to the support. The robot head performs the desired task.

As discussed above, the robot operates in a work area or envelope. This work area is usually in the form of a rectangular box having a length, width, and height. The robot is able to reach any point within this area because of the arrangement of the rails, bridge, and robot head. The rails provide a lengthwise axis on which the bridge can move. Thus any point along the length of the work area can be reached. The robot, because it is movable with respect to the bridge, can reach any point along the width of the work area. In addition, the robot support and therefore the robot head can move up and down, so that any height in the work area can be reached.

For convenience of reference, the work area is said to have a length of dimension X, a width having dimension Y, and a height Z, with dimension X being greater than Y. The usual practice in constructing gantries has been to place the rails (or a single suspended rail) on the two long sides (or side) (X-axis) so that the bridge will have a dimension of Y and thus span the Y-axis. See, e.g., U.S. Pat. Nos. 457,441, 1,694,084, 1,975,094, 3,884,363, 4,561,551, and 4,571,149 and U. K. Patent Application Nos. 2,120,202A and 2,176,168A. In fact, U.S. Pat. Nos. 3,116,586 and 4,642,017 teach that the rails should extend the length of the shop floor or the yard in which an overhead crane operates.

The reason for the conventional configuration of the crane is to keep the bridge, which is the heaviest movable component, to the lowest possible weight. This is done by having the bridge span the lesser Y dimension. This design results in reducing the mass which must be accelerated to move from one point to another. If a robot is used with a gantry of conventional designs, the bridge will move the longer distance on the X-axis and the robot will move the shorter distance on the Y-axis.

SUMMARY OF THE INVENTION

We provide a cantilever gantry robot construction having the conventional components of a pair of elongated substantially spaced parallel rail means, bridge means spanning the rail means and movable relative to the rail means and robot means mounted on the bridge means and movable relative to the bridge means. We further provide that the rail means are positioned along the width of the work area and that the bridge means span the length of the work area. This unique construction improves "duty cycle time" which is defined as the actual time required to move a given distance from a beginning idle condition. Duty cycle times are improved because the distance through which the bridge means must move is reduced so that the heavy element (the bridge means) moves through the short distance and the robot means, which is mounted on the bridge means and is lighter, moves through a longer distance. Although acceleration of the more massive bridge means is more difficult than with conventional arrangements, the need for high acceleration of the bridge means is lowered because of the shorter distances that need to be travelled with the result that the bridge means can be moved between necessary points with a lower stress due to acceleration forces.

We also provide a drive mechanism suitable for use with a gantry robot. The drive mechanism may be in the form of an improved rack and pinion system for changing the rotary motion of the driving motor into rectilinear motion to move the bridge and the robot head. The improved rack and pinion consists of a pinion which is operatively associated with a rack, the rack having a series of individually mounted and spaced apart pins. These pins are mounted in precision roller bearings thus allowing them to freely rotate when engaged by the pinion. The rack and pinion are constructed to act at a zero degree pressure angle, the diameter of the pitch circle and the diameter of the base circle of the pinion being equal.

Other details, objects, and advantages of our invention will become more apparent in the following description of a present preferred embodiment of our invention.

BRIEF DESCRIPTION OF THE DRAWINGS

In the accompanying drawings, we have illustrated a present preferred embodiment of our invention in which:

FIG. 4 is a right side elevational view of the robot means as it is mounted on the bridge.

FIG. 5 is a right side elevational view of the pinion of the present invention.

FIG. 6 is a top plan view of the pinion.

DESCRIPTION OF THE PREFERRED EMBODIMENT

Figure 1:
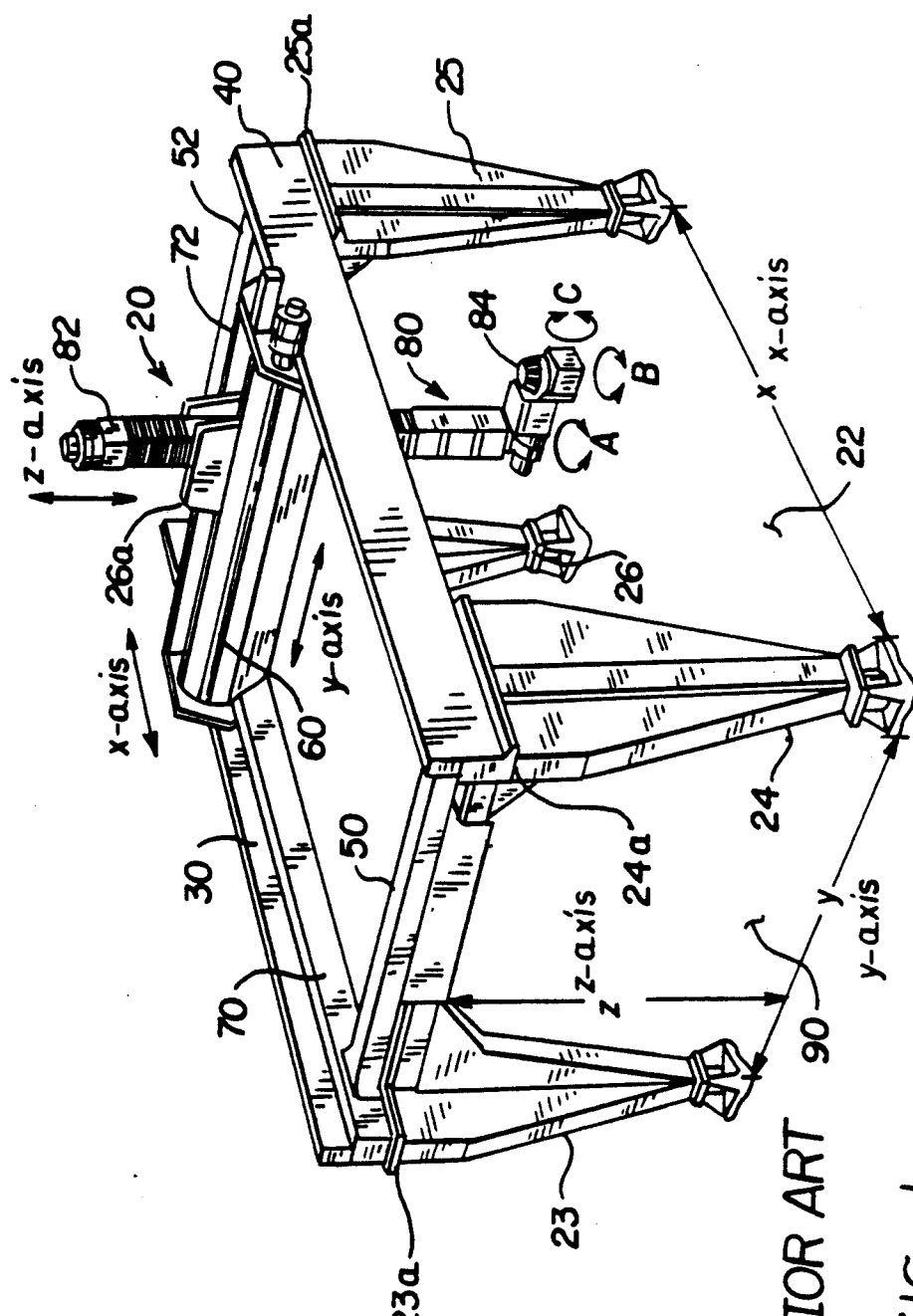
FIG. 1 is an isometric view of the prior art standard bridge type gantry device.

FIG. 1 shows the prior art standard bridge gantry 20. This gantry 20 is suspended above a shop floor 22. The gantry 20 is comprised of four upright supports 23–26. Supports 23 and 26 are arranged in one row and supports 24 and 25 are arranged in a second row which is parallel to the first row. The upper ends 23a and 26a of supports 23 and 26 are joined by a first rail 30, whereas the upper ends 24a and 25a of supports 24 and 25 are joined by a second rail 40. Cross beams 50 and 52 provide further structural integrity for the gantry 20.

The gantry 20 is further comprised of a bridge 60 which spans the parallel space between the first row of supports 23 and 26 and the second row of supports 24 and 25. The bridge 60 is movable on the rails 30 and 40 by a power system of motors and wheels on either side of the bridge 60. The bridge 60, thus, is able to move longitudinally from a point 70 near cross beam 50 to a point 72 near cross beam 52 and vice versa.

Mounted on the bridge 60 is robot means 80. Robot means 80 can not only move up and down relative to the bridge 60, but also from one side of the bridge 60 to the other, as will be further explained below. This movement is also accomplished by a self contained power system. Robot means 80 is comprised of a fixed longitudinal support 82 which engages the bridge 60 and provides a fixed support which allows the robot head 84 to move up and down. Robot head 84 can perform desired tasks such as welding, gluing, laser cutting, or material handling. Different applications for robot head 84 are well known to those skilled in the art and will not be explained in detail.

The gantry 20 can service a work area 90 consisting of a three dimensional box having length X, width Y, and height Z. Any point in the work area 90 can be reached by the robot head 84. This is because bridge 60 moves in the X-axis, and robot head 84 moves in the Y and Z axes. It is conventional in the art to refer to the longest dimension as the X dimension. In this conventional design, the bridge 60 always spans the Y or shorter dimension of the two dimensions, X and Y. This is because it is desired to keep the bridge 60, which is the most massive part of the gantry 20, to a minimum weight.

Figure 2:
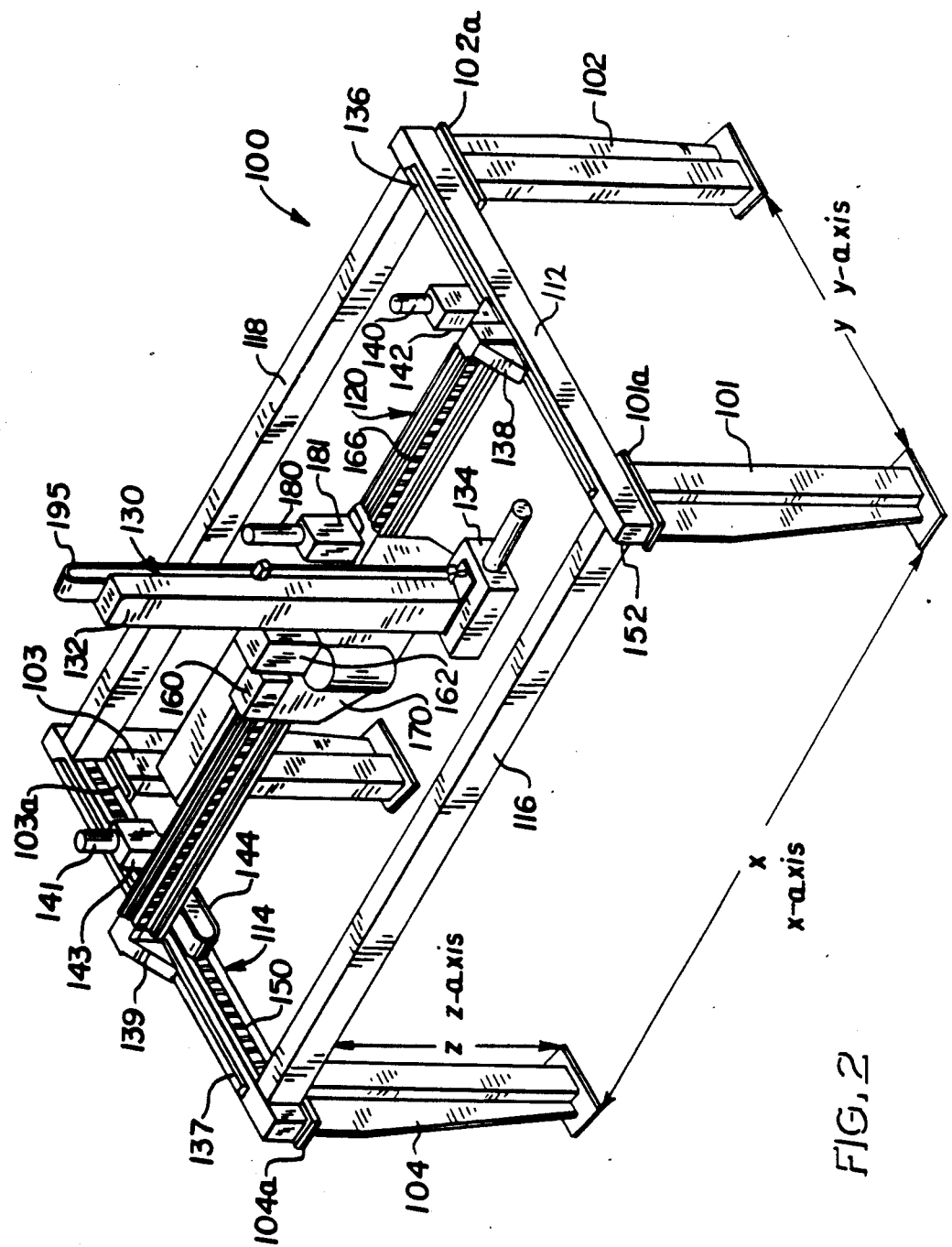
FIG. 2 is an isometric view of the gantry robot construction of the present invention.

FIG. 2 illustrates a preferred embodiment of our gantry robot construction 100. For convenience of reference, the gantry 100 is placed in the same dimension work area as was the prior art device illustrated in FIG. 1. That is, the work area of gantry 100 is also comprised of a rectangular box having dimensions X, Y, and Z, with dimension X being greater than dimension Y.

As can be seen, gantry 100 reverses the layout of the prior art gantry 20. Gantry 100 consists of four upright supports 101, 102, 103, and 104. Supports 101 and 102 are arranged in one row and supports 103 and 104 are arranged in a second row which is parallel to the first row. The upper ends of the supports 101a and 102a respectively are joined by a first rail 112 and the upper ends of supports 103a and 104a respectively are joined by a second rail 114. Cross beams 116 and 118 provide further structural integrity for the gantry 100.

Bridge 120 spans the X dimension of the work area and moves in the Y-axis. Robot means 130 is again mounted on the bridge 120 and is able to move not only in the X-axis, but also up and down in the Z-axis. Robot means 130 is similar to that of the prior art in that it is comprised of a longitudinal support 132 and a robot head 134. The robot means 130 is mounted on the bridge 120 by methods well known to those skilled in the art. The bridge 120 and the robot means are moved by respective power systems which will be discussed immediately hereinbelow.

The bridge 120 is mounted on linear bearing rails 136 and 137 attached to the top surface of the rails 112 and 114. These linear bearing rails 136 and 137 receive linear bearing guides (not shown) mounted on the bottom of stabilizers 138 and 139 which are attached to either end of the bridge 120. The linear bearing guides are a multiple contact restraint construction using a four row circular contact design. An example of a linear bearing rail and guide system is sold under the trade designation "Type HSR-TA" by THK Industries.

Movement of the bridge 120 in the Y-axis, or along rails 112 and 114 is accomplished by motors 140 and 141 mounted on either end of the bridge 120. These motors 140 and 141 are connected to respective gear reducers 142 and 143. The gear reducers 142 and 143 are necessary to convert the high speed rotation of the shaft of the motors 140 and 141 to the slower but more powerful rotation of the output of the gear reducers 142 and 143. A power track 144, associated with motor 141 and gear reducer 143, is provided to house the conduit which supplies power to the motors. A second power track (not shown) is associated with motor 140 and gear reducer 142.

The output shaft of each of the gear reducers (not shown) are connected to respective pinions. The pinion will be described in detail hereinafter with respect to FIGS. 5 and 6. The pinions engage racks 150 and 152 (not shown), respectively, which are mounted on the inside sidewalls of the respective rails 114 and 112. The racks 150 and 152 will also be described in detail hereinafter with reference to FIGS. 7 and 8. The racks 150 and 152 and pinion change the rotary motion of the motor driven gear reducers into rectilinear motion to move the bridge 120 in the Y-axis. Thus, the bridge 120 is moved by the motor driven gear reducers 142 and 143 turning the pinion which engages the racks 150 and 152. This allows the bridge 120 to move along the linear bearing rails 136 and 137 attached to the top on the rails 112 and 114.

Mechanisms for equalizing the motion of the respective sides of the bridge 120 can be provided. These mechanisms allow each end of the bridge 120 to travel at the same velocity, thus reducing skewing of the bridge 120.

Movement of the robot means 130 in the X-axis is also accomplished by means of a power system consisting of a motor 160, gear reducer 162, pinion 164, and rack 166. This can best be seen by observing FIG. 3. The motor 160 is mounted on a platform 170 and engages the gear reducer 162. As with the Y-axis motion, the platform 170 is mounted on linear bearing guides (not shown) which engage first linear bearing rails 171 and second linear bearing rail 172 which are mounted on the bridge 120. The pinion 164 is connected to the shaft of the gear reducer 162 and engages the rack 166 mounted on the sidewall of the bridge 120. The rack 166 is mounted along the entire length of the bridge 120.

Thus the robot means 130 is moved in the X-axis by the motor 160 and gear reducer 162 turning the pinion 164, which in turn engages the rack 166. This moves the platform 170 which carries to the robot means 130. The platform 170 moves by the linear bearing guides moving along the linear bearing rails 171 and 172.

Figure 3:
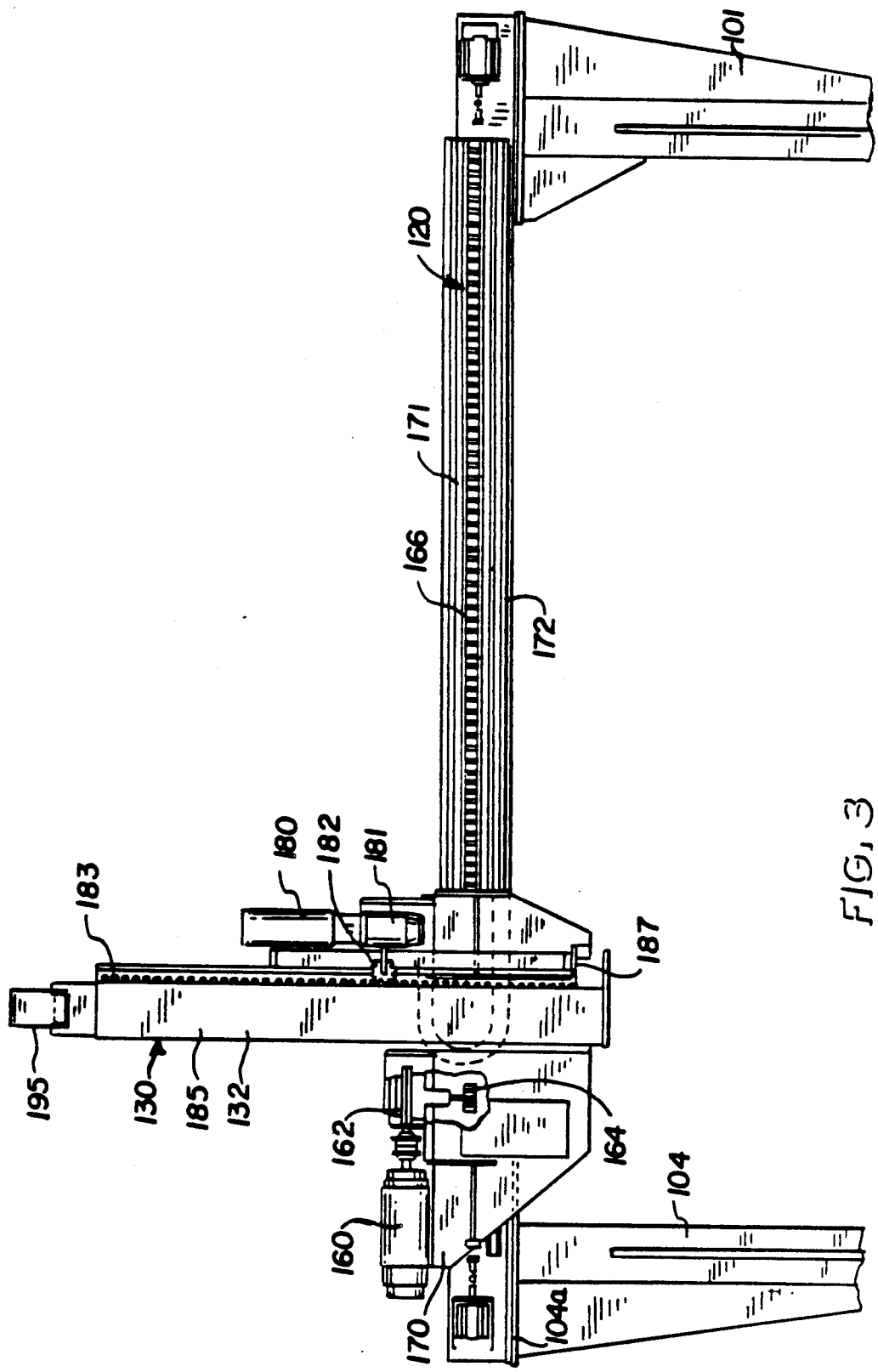
FIG. 3 is a front elevational view showing the bridge and robot means.

Movement of the robot means 130 in the Z-axis is similar to that of movement of the bridge 120 in the Y-axis and can best be seen by observing FIGS. 3 and 4. A motor 180 is connected to a gear reducer 181 which in turn drives a pinion 182 that engages a rack 183. The rack 183 and pinion 182 are similar to those used to provide motion in the other axes and will be described hereinbelow with respect to FIGS. 5-8. A power track 195 is provided to house the conduits which supply power to the motor 180.

The rack 183 is mounted on the longitudinal support means 132 of the robot means 130. Again, there are linear bearing guides (not shown) mounted on the platform 184 holding the motor driven gear reducer 181. These linear bearing guides are operatively associated with linear bearing rails which allow the robot means 130 to move in the Z-axis. Thus, the robot means 130 is moved in Z-axis along the linear bearing 187 by the motor driven gear reducer 181 turning the pinion 182 which engages the rack 183 which then moves the platform robot means 130 along the Z-axis linear bearing rails 187.

It will be appreciated that robot head 134 can reach any point in the working area defined by the box having dimensions X, Y, and Z. This is because bridge 120 moves in the Y-axis, and robot head 134 can move in the X and Z axes.

The bridge 120 is more massive than bridge 60. However, in our preferred embodiment, bridge 120 will not have to move through a distance as great as that of bridge 60 of the prior art gantry device 20. Robot means 130, the lightest portion of the gantry 100, moves in the longer, or X, dimension. Thus, robot means 130 can move more quickly through the longer dimension (X). Also, because the bridge 120 moves through a shorter distance, the need for high acceleration of the bridge 120 is also reduced with the result that the bridge 120 can be moved between necessary points with a lower stress due to acceleration forces.

Referring to FIGS. 5-8, the improved rack and pinion used in the power systems for each axis will be described hereinbelow. FIGS. 5 and 6 show a representative pinion 200. This pinion 200 is designed to be mounted on the shafts of the various gear reducers described above. The pinion 200 is a modified involute gear specifically designed so that each tooth properly engages the cylindrical pins of the rack (described below). More particularly the pinion engages the pins of the rack at a zero degree pressure angle. The pinion 200 has a plurality of teeth 201. The pitch circle of the pinion is identified by reference number 205. The addendum (the distance from the pitch circle to the outside diameter of the pinion) is indicated at 204 and the dedendum (the distance from the pitch circle to the base of the tooth) is indicated at 202. The tooth profile above the pitch circle is an involute which is modified by being cut off at the tip 206. The tooth profile below the pitch circle is a slightly modified circular profile.

Figure 7:
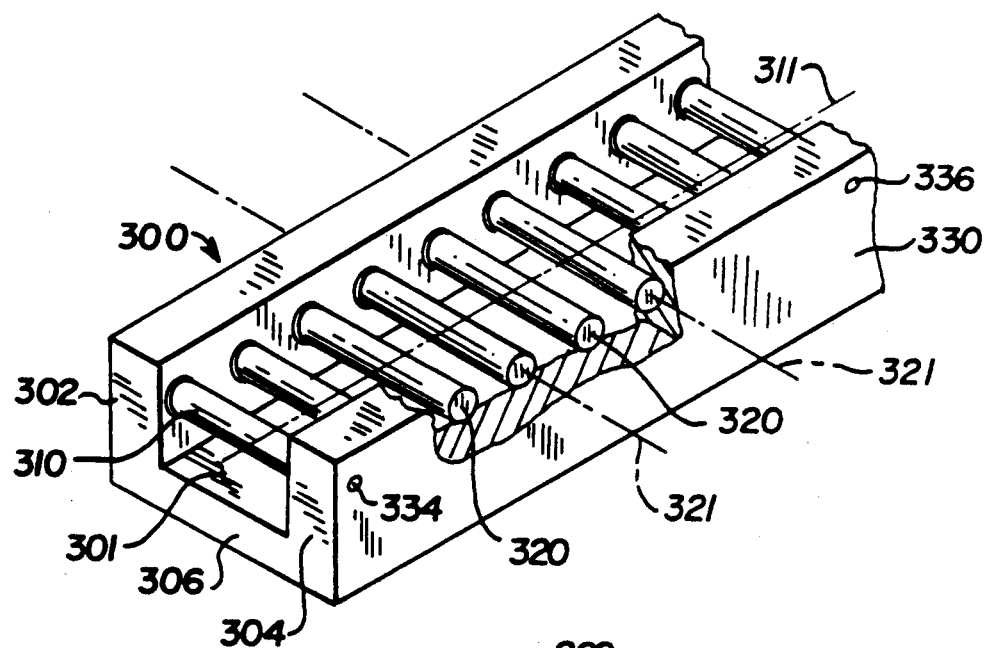
FIG. 7 is an isometric view, partially in section, of the rack of the present invention.

The rack 300 is illustrated in FIG. 7 and consists of sidewalls 302 and 304 and a base 306 which form a U-shaped channel 301. Mounted in the U-shaped channel 301 are rotatable pins 310. These pins 310 are substantially cylindrical in shape and will be sized and spaced so as to complement the size and shape of the pinion 200. The pins 310 are mounted in the sidewalls 302 and 304 of the channel so that there is a space between the bottom edge of the pins 310 and the top surface of the base 306. The pins 310 are rotatable because they are mounted in precision roller bearings 320. The centers of the pins 321 intersect the pitchline 311 of the rack 300.

Another feature of the rack is the removable facing 330 mounted on the outside edge of the sidewall 304. This facing 330 can be mounted by bolts 334 and 336. By removing the bolts 334 and 336 and then the facing 330, the pins 310 and bearings 320 can be accessed for repairs or replacements. It will be appreciated that sidewall 302 may also have a removable facing.

Figure 8:
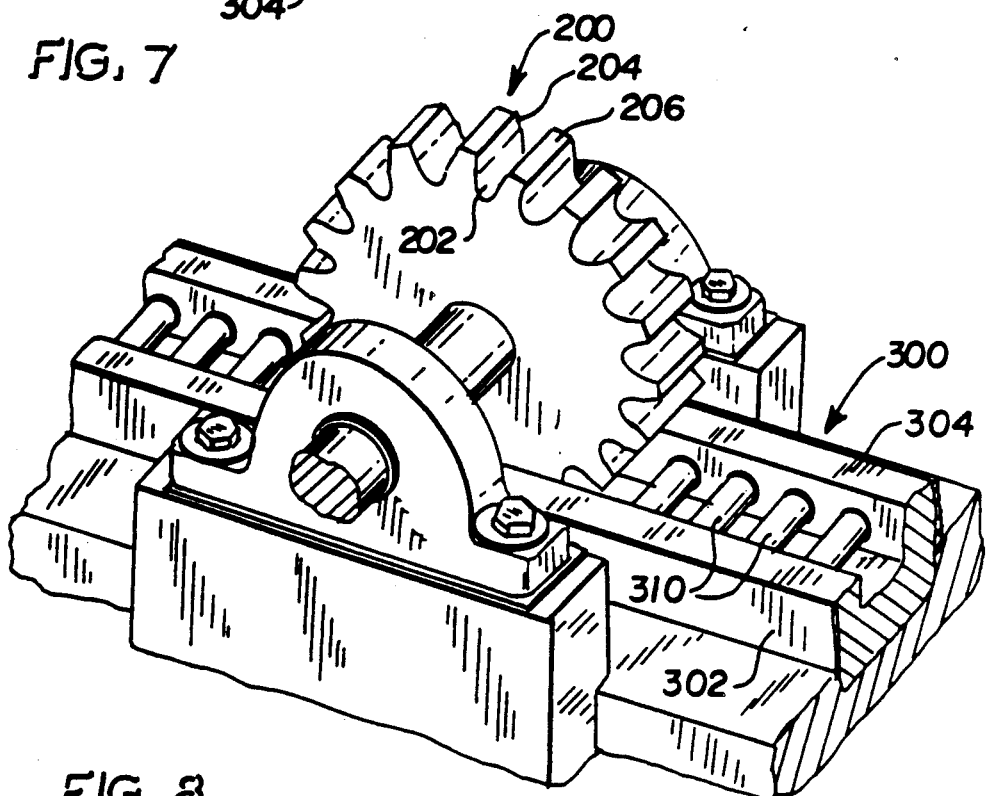
FIG. 8 is an isometric view, partially in section, showing the pinion engaging the rack.
Figure 10:
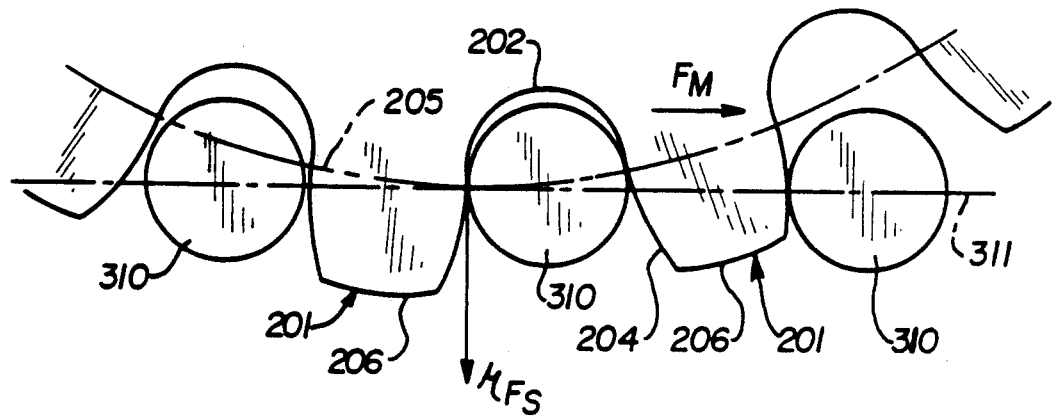
FIG. 10 is a detailed side elevational view of the rack and pinion of the present invention.

FIG. 8 shows the pinion 200 engaging the rack 300. The pitch circle 205 of the pinion 200 is tangent to the pitchline 311 of the rack 300 when the pinion 200 engages the rack 300 (FIG. 10). This will be further described hereinbelow with respect to FIG. 10. The faces of the teeth below the pitch circle are true radii which are relieved in the center region to provide root clearance for the pins. The outside diameter of the pinion 200 has to be selected sufficiently large enough to ensure an overlap between rack pins 310 and pinion teeth of the pinion 200.

FIG. 10 shows a segment of pinion 200 with several teeth 201 engaging pins 310 of rack 300. The diameter of the pitch circle (the pitch diameter) is equal to the diameter of the base circle (the base diameter). Stated in other terms, the base circle upon which the involute faces of teeth 201 are generated is congruent with pitch circle 205. Accordingly, the face of each tooth is tangent to a radius of the pinion at the pitch circle. As a result the driving force $F_M$ is along the pitchline of the pinion and the pitchline of the rack, and the pressure angle is zero degrees.

Figure 9:
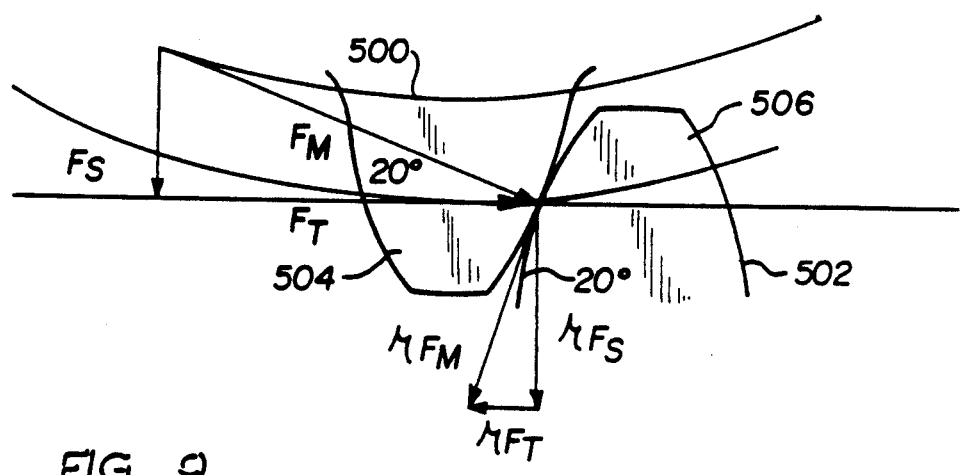
FIG. 9 is a detailed side elevational view of a standard meshing gear system.

In order to understand the advantages of the rack and pinion of the present invention, it is necessary to understand some basic rack and pinion characteristics. FIG. 9 shows a partial view of a pinion 500 meshing with another pinion 502. The pinion tooth 504 of pinion 500 and the pinion tooth 506 of pinion 502 have standard 20° involute tooth profiles. The driving force $F_M$ supplied by a motor or other means which drives the pinion 500 is shown by a vector $F^M$. This driving force $F_M$ has two components; $F_T$ which is a tangential force and $F_S$ which is a separation force. $F_T$ is the force in the direction of motion and is desired to be maximized. $F_S$ is a separation force which is a force perpendicular to the direction of motion and thus, is desired to be minimized.

Also shown is the frictional force $\mu F_M$. This frictional force $\mu F_M$ has a frictional tangential force $\mu F_T$ component, which is opposite the direction of motion and a frictional separation force $\mu F_S$ component.

In conventional rack and pinion arrangements such as FIG. 9, there are substantial separation forces ($F_S$). These separation forces result in a reduction of tangential forces ($F_T$) which in turn diminishes the efficiency of the rack and pinion. This is illustrated by the following calculations:

The $F_T$ vector, for a 20° pressure angle, is calculated to be:

$$F_T = \text{COS (P.A.)} \times F_M \quad (\text{P.A.} = \text{Pressure Angle})$$

$$F_T = \text{COS (20°)} \times F_M$$

$$F_T = 0.9397 \, F_M$$

The $F_T$ vector, assuming the coefficient of friction $\mu = 0.125$ is equal to $$\mu F_T = \text{Sin P.A.} \times \mu F_M$$

$$\mu F_T = \text{Sin 20°} \times \mu F_M$$

$$\mu F_T = 0.3420 \times 0.125 \, F_M$$

$$\mu F_T = 0.0427 \, F_M$$

With these two values, $F_T$ and $\mu F_T$, the total loss in tangential force, $F_T$ can be calculated as follows:

Total Loss Tangential Force $= (1 - 0.9397 \, F_M) + \mu F_T$

Total Loss Tangential Force $= 1 - 0.9397 \, F_M + 0.0427 \, F_M$

Total Loss Tangential Force $= F_M(0.0603 + 0.0427)$

Total Loss Tangential Force $= 0.1030 \, F_M$ or, which translates into the total loss of Tangential force being 10.3%.

The Total separation force is calculated as follows:

$$F_S \text{ Total} = F_S + \mu F_S$$

$$F_S \text{ Total} = (\text{Sin (P.A.)} \times F_M) + (\text{COS P.A.}) \times \mu F_M$$

$$F_S \text{ Total} = \text{Sin 20°} \times F_M + \text{COS 20°} \times 0.125 \, F_M$$

$$F_S \text{ Total} = 0.3420 \, F_M + 0.1174 \, F_M$$

$$F_S \text{ Total} = 0.4594 \, F_M$$

or, the separation forces are equal to 45.9% of the driving force ($F_M$).

FIG. 10 illustrates the rack and pinion system of the invention. As can be seen, the tangential force ($F_T$) is equal to the driving force ($F_M$) because there is a zero degree pressure angle between the pinion tooth and the rotatable pin. This is because the pitch diameter of the pinion is equal to the base diameter of the modified involute profile. Thus, the total tangential force loss is equal to $$F_T = F_M$$

$$\mu F_T = \text{Sin (P.A.)} \times \mu F_M$$

$$\mu F_T = 0 \times F_M = 0$$

and $$F_S = \text{Sin (P.A.)} \times F_M$$

$$F_S = 0$$

$$\mu F_S = \text{COS (P.A.)} \times \mu F_M \, (\mu = 0.001 \text{ for the roller bearings 320 of the rack 300})$$

$$\mu F_S = \text{COS 0°} \times 0.001 \, F_M$$

$$\mu F_S = 0.001 \, F_M$$

Since $F_T = F_M$, the total tangential loss of force is equal to 0. The total separation separation force is equal to the frictional separation forces $\mu F_S$ or $0.001 \, F_M$.

It will be appreciated that the rack and pinion system of the invention minimizes separation forces and the total tangential loss of force, while at the same time maximizing the tangential forces. This increases the efficiency of the system over known rack and pinion systems.

It will be well known to those skilled in the art that different dimensioned racks and pinions can be used to meet backlash, velocity, and accelerating rates required for certain robot head payloads, applications, and operating conditions.

The advantages of this rack and pinion design are (1) faster speeds possible due to less friction; (2) low noise; (3) minimal back lash; (4) less replacement and repair; (5) longer life due to rolling friction versus sliding friction; (6) reduced maintenance; (7) no lubrication required; and (8) minimal foreign particulates to interfere with operation. The rack and pinion feature thereby contributes to the overall performance of the design.

While we have illustrated and described a present embodiment of the invention, it is to be understood that the invention is not limited thereto and may be otherwise variously practiced within the scope of the following claims.

We claim:

1. A rack and pinion comprising:
   rack means; and
   pinion means for conversion between rotary and rectilinear motion;
   one of said rack means and pinion means comprising rotatable pins; and
   the other of said rack means and pinion means comprising teeth whose profile comprises an involute generated from a base circle which is congruent with the pitch circle of the other of said rack means and pinion means, whereby there is substantially a zero degree pressure angle between the pins and the teeth.

2. The apparatus of claim 1 in which
   the rack means have two generally parallel sidewalls in which rotatable pins are mounted and
   the pinion means have teeth which engage said rack means and convert rotary motion of said pinion means into rectilinear motion, said pinion means having teeth whose profile comprises an involute generated from a base circle which is congruent with the pitch circle of the pinion, whereby there is substantially a zero degree pressure angle between the pins and the teeth of the pinion.

3. The apparatus of claim 1, in which
   said rotatable pins are mounted in antifriction bearings.

4. The apparatus of claim 3, in which
   a facing of at least one of said sidewalls is removable.

5. The apparatus of claim 1, in which said rotatable pins are cylindrical.

6. The apparatus of claim 1, including
in operative connection with said pinion means, driving means supplying to said pinion a driving force at the rack means having a tangential force component and a separation force component, said tangential force component being perpendicular to said separation force component.

7. The apparatus of claim 6, wherein
said tangential force component is substantially equal to said driving force and the separation force is substantially zero.

8. Drive means for a robot gantry and the like, said drive means comprising a rack and a driven pinion, the rack comprising a plurality of spaced rotatable pins which are engaged by teeth on the pinion, the pinion having teeth whose profile comprises an involute profile generated from a base circle which is congruent to the pitch circle of the pinion, said rack and pinion being characterized by a zero degree pressure angle between the pinion teeth and the rack pins.

9. Power transmission means comprising driving means and drive means, one of said driving means and driven means having teeth and the other of said driving means and driven means having rotatable pins which engage the teeth, said teeth having a profile which comprises a curve generated from a base circle which is congruent to the pitch circle whereby there is a substantially zero degree pressure angle between the pins and the teeth.

10. The apparatus of claim 9 in which the curve at the pitch line is perpendicular to the pitch line.

11. The apparatus of claim 9 in which the rotatable pins are mounted in antifriction bearings.

* * * * *

UNITED STATES PATENT AND TRADEMARK OFFICE
CERTIFICATE OF CORRECTION

PATENT NO. : 4,998,442

DATED : March 12, 1991

INVENTOR(S) : Gordon T. Brown and David A. Stewart

It is certified that error appears in the above-identified patent and that said Letters Patent is hereby corrected as shown below:

Column 10, line 5, "drive" should be --driven--.

Signed and Sealed this

Twenty-fifth Day of August, 1992

*Attest:*

DOUGLAS B. COMER

*Attesting Officer*      Acting Commissioner of Patents and Trademarks